United States Patent [19]

Bargfrede et al.

[11] Patent Number: 5,326,332
[45] Date of Patent: Jul. 5, 1994

[54] ENDLESS ELASTOMERIC BELT

[75] Inventors: Brent C. Bargfrede, Dunlap; Anthony E. Kirn, Pekin; Brian D. McFeeters, Morton, all of Ill.

[73] Assignee: Caterpillar Inc., Peoria, Ill.

[21] Appl. No.: 74,524

[22] Filed: Jun. 11, 1993

[51] Int. Cl.$^5$ .......................... F16H 7/00; F16G 1/00
[52] U.S. Cl. ..................................... 474/249; 474/250
[58] Field of Search ........ 474/237, 240, 242, 249-252, 474/265

[56] References Cited

U.S. PATENT DOCUMENTS

| 2,941,413 | 6/1960 | Huber et al. | 474/250 |
| 4,034,615 | 7/1977 | Brooks | 474/250 |
| 4,193,312 | 3/1980 | Cicognani | 474/250 X |
| 4,416,649 | 11/1983 | Kohrn | 474/250 X |
| 4,721,498 | 1/1988 | Grob | 474/261 |

Primary Examiner—Thuy M. Bui
Attorney, Agent, or Firm—John W. Grant

[57] ABSTRACT

An endless elastomeric belt includes a plurality of longitudinally separated guide blocks each having a longitudinally extending slot in a tip portion thereof. The slot reduces the mass of the guide block at a location most effective for reducing acceleration forces generated in the belt at a position where the belt separates from the entrained wheels at high rotational speeds. Reducing the acceleration forces reduces fatigue failures tending to occur in the bond joint between the guide block and a belt body.

3 Claims, 1 Drawing Sheet

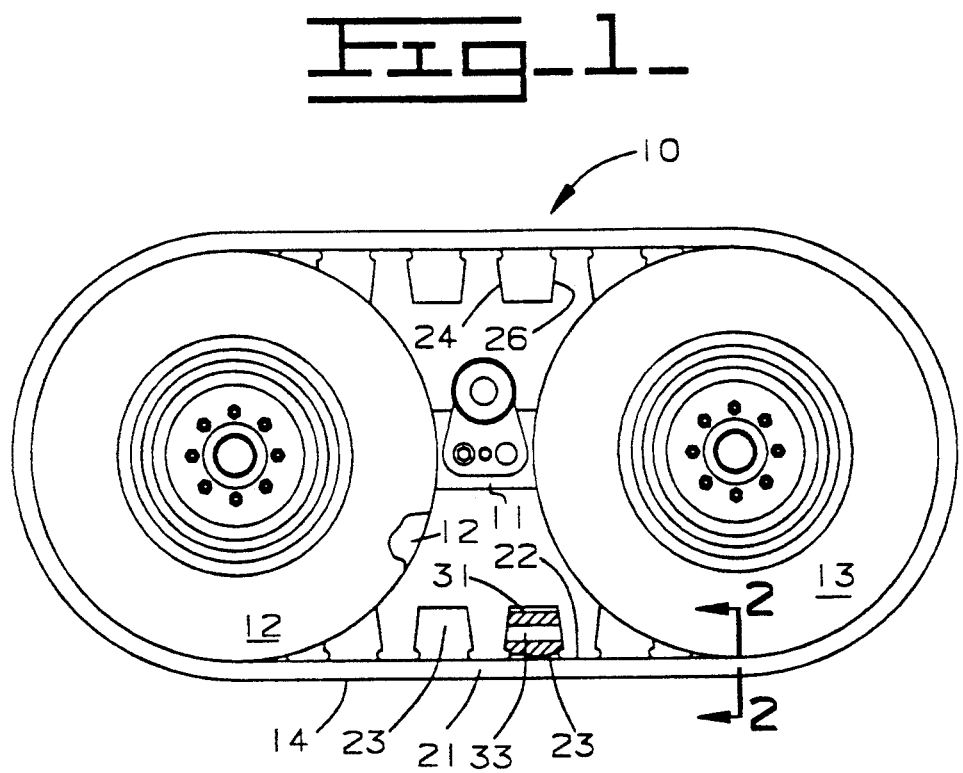
Fig_1_
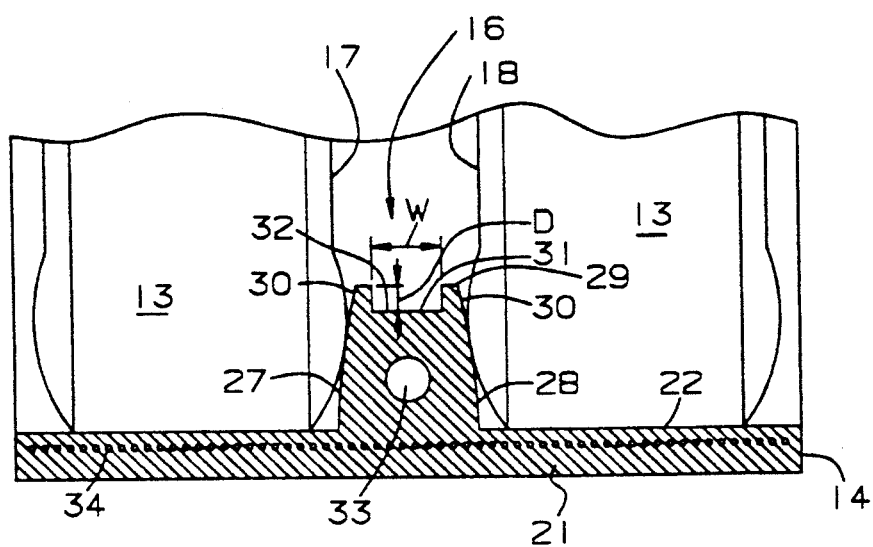
Fig_2_

ENDLESS ELASTOMERIC BELT

DESCRIPTION

1. Technical Field

This invention relates to an endless elastomeric belt for operation about a pair of wheels more particularly to an endless elastomeric belt having guide blocks for providing the desired guiding function while minimizing acceleration forces imposed on the belt by the guide blocks.

2. Background Art

In order to avoid the disadvantages of conventional, multi-jointed and metallic track chains for vehicles, an increasing amount of development effort has been directed to utilizing a continuous elastomeric or rubber belt entrained about a pair of longitudinally spaced wheels. Such elastomeric belts commonly have a plurality of longitudinally separated, inwardly extending guide blocks received in a guide channel in the wheels for maintaining lateral registry between the belt and the wheels. The guide blocks are normally bonded to the interior surface of an endless body of the belt and by necessity have a high modulus of elasticity. In high speed and heavy duty agricultural, earth moving and military applications, the demands upon such a belt are particularly great. For example, some trailers having an endless belt undercarriage are towed at speeds of 80-90 kph. As the belt wraps around the trailing wheel, acceleration forces on the belt adjacent each guide block go from substantially zero to over 100 Gs in only fractions of a second. Such high acceleration forces lead to accelerated fatigue failure at the junction between the guide blocks and the body of the belt. Moreover, even though the guide slots in the wheels are angled and the side surfaces of the guide blocks are tapered inwardly to provide enhanced guiding functions, the extremely stiff nature of the guide blocks particularly at the tip portions causes harsh engagement between the guide blocks and the wheels. This causes some scuffing of both the guide blocks and the wheels.

Accordingly, what is needed is an economical and reliable endless elastomeric belt for increased longevity in high speed applications without sacrificing the self centering aspects thereof afforded by the guide blocks.

The present invention is directed to overcoming one or more of the problems as set forth above.

DISCLOSURE OF THE INVENTION

In accordance with one aspect of the present invention, an endless elastomeric belt comprises an endless body of closed loop construction having an interior surface and a plurality of longitudinally separated guide blocks connected to and extending interiorly from the interior surface. Each block has a pair of opposite ends, a pair of belt positioning guide surfaces, a tip portion, and a longitudinally extending slot formed in the tip surface.

BRIEF DESCRIPTION OF THE DRAWINGS

FIG. 1 is a diagrammatic side elevational view of an endless elastomeric belt of the present invention entrained around a pair of wheels; and FIG. 2 is a sectional view taken along line 2—2 of FIG. 1.

BEST MODE FOR CARRYING OUT THE INVENTION

FIG. 1 illustrates an exemplary endless elastomeric belt undercarriage 10 suitable for attachment to a trailer (not shown). The undercarriage 10 includes a longitudinally extending frame 11, first and second pair of laterally spaced pneumatic wheels 12, 13 suitably rotatably connected to the opposite ends of the frame 11, and an endless elastomeric belt 14 entrained about the first and second pair of wheels. Each pair of wheels define a circumferential guide channel 16 therebetween and bounded by the opposed side walls 17, 18 of the wheels.

The endless elastomeric belt 14 comprises an endless body 21 of closed loop construction having an interior surface 22 and a plurality of longitudinally separated guide blocks 23 suitably bonded to and extending interiorly from the interior surface 22. Each guide block has a pair of opposite end surfaces 24,26, a pair of belt positioning side surfaces 27,28 and a tip portion 29. A longitudinally extending slot 31 is formed in the tip portion 29 by a pair of flanges 30 and extends the full length of the guide block. Each of the guide blocks also includes a hole 33 extending longitudinally between the end surfaces 24, 26. The slot 31 in this embodiment has a substantially flat surface 32, a width W and a depth D with the width being greater than the depth. Alternatively, the slot may be U-shaped or some other configuration so long as the integrity of the guide block between the slot and the hole 33 is not compromised.

The body 21 of the belt 14 includes at least one layer of inextensible reinforcing filaments 34 embedded therein to provide the belt with a longitudinally inextensible yet flexible character. Additionally, suitable biased breaker plies, not shown but well known in the art, can be included in the body to provide lateral stiffness to the belt.

INDUSTRIAL APPLICABILITY

The addition of the longitudinally extending slot 31 in the tip portion 29 of the guide block 23 decreases the mass of the guide blocks at the most effective locations for reducing the acceleration forces. The reduction in the acceleration forces greatly decreases the incidence of fatigue failures by a factor of about 6 to 8 times. Moreover, it is theorized that the flanges 30 which define the slot provides increased flexibility of the tip portion to soften the harshness of engagement between the guide blocks and the wheels particularly when the belt is subjected to side forces thereon.

Other aspects, objects and advantages of this invention can be obtained from a study of the drawings, the disclosure and the appended claims.

We claim:

1. An endless elastomeric belt comprising:
   an endless body of closed loop construction having an interior surface; and
   a plurality of longitudinally separated guide blocks bonded to and extending interiorly from the interior surface, each guide block having a pair of opposite end surfaces, a pair of belt positioning side surfaces, a tip portion, and a longitudinally extending slot formed in the tip portion.

2. The endless elastomeric belt of claim 1 wherein the slot extends the full length of the guide block.

3. The endless elastomeric belt of claim 1 wherein the slot has a substantially flat bottom surface.

* * * * *